US012608060B2

(12) United States Patent
Kariya

(10) Patent No.: US 12,608,060 B2
(45) Date of Patent: Apr. 21, 2026

(54) POWER MANAGEMENT AND DELIVERY FOR HIGH BANDWIDTH MEMORY

(71) Applicant: Micron Technology, Inc., Boise, ID (US)

(72) Inventor: Rajesh H. Kariya, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 81 days.

(21) Appl. No.: 18/400,614

(22) Filed: Dec. 29, 2023

(65) Prior Publication Data

US 2024/0231459 A1     Jul. 11, 2024

Related U.S. Application Data

(60) Provisional application No. 63/437,474, filed on Jan. 6, 2023.

(51) Int. Cl.
*G06F 1/26* (2006.01)
*G06F 1/3203* (2019.01)

(52) U.S. Cl.
CPC .............. *G06F 1/26* (2013.01); *G06F 1/3203* (2013.01)

(58) Field of Classification Search
USPC ........................................................ 713/300
See application file for complete search history.

(56) References Cited

U.S. PATENT DOCUMENTS

2008/0185568 A1*   8/2008   Kwon .................... H10B 63/10
                                                           438/102
2010/0079959 A1*   4/2010   Letz .................... H01L 25/0657
                                                           361/717

2014/0184312 A1*   7/2014   Kim .................. H01L 23/49822
                                                           327/513
2018/0046908 A1*   2/2018   Cox ........................ G06N 3/065
2019/0042251 A1*   2/2019   Nurvitadhi ............ G06F 30/343
2019/0385994 A1*  12/2019   Rifani ...................... H01L 23/32
2020/0303344 A1*   9/2020   Manipatruni ........... H01L 24/73
2021/0036059 A1*   2/2021   Leng .................... H01L 25/0655
2021/0151674 A1*   5/2021   Pesic .................. G11C 11/5685
2021/0216224 A1*   7/2021   Kim .................... G11C 11/4074
2022/0352451 A1*  11/2022   Huang .................... H10N 10/13
2023/0187365 A1*   6/2023   Lin .................... H03K 19/1776
                                                           257/774
2023/0352415 A1*  11/2023   Dungan .............. H01L 23/5386
2024/0096745 A1*   3/2024   Mayukh .................. H01L 24/32
2024/0147708 A1*   5/2024   Matsuzaki ............. H10B 41/40
2025/0183229 A1*   6/2025   Loh .................... H01L 23/49838

* cited by examiner

*Primary Examiner* — Volvick Derose
(74) *Attorney, Agent, or Firm* — Holland & Hart LLP

(57) ABSTRACT

Methods, systems, and devices for power management and delivery for high bandwidth memory are described. A high bandwidth memory (HBM) device may include a power management integrated circuit (PMIC) and a voltage regulator integrated within an interface die of the HBM system or included as a separate chip within the HBM system stack. Accordingly, the HBM system may be supplied a higher voltage and may regulate the voltage to a desired power level, which may increase the total power available to the HBM system without increasing the quantity of microbumps. Additionally, a ground voltage, a positive voltage, or both, may be supplied to the HBM device via a back interface of the HBM device, which may reduce the quantity of microbumps at a front interface. In some examples, a modified heatsink assembly may supply the ground voltage, the positive voltage, or both, to the HBM system.

20 Claims, 9 Drawing Sheets

POWER MANAGEMENT AND DELIVERY FOR HIGH BANDWIDTH MEMORY

CROSS REFERENCE

The present application for patent claims priority to and the benefit of U.S. Provisional Application No. 63/437,474 by Kariya, entitled "POWER MANAGEMENT AND DELIVERY FOR HIGH BANDWIDTH MEMORY," filed Jan. 6, 2023, assigned to the assignee hereof, and is expressly incorporated by reference in its entirety herein.

TECHNICAL FIELD

The following relates to one or more systems for memory, including power management and delivery for high bandwidth memory.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

As demand for high bandwidth memory (HBM) systems increases, it may be desirable to improve techniques for regulating power to HBM systems. In some HBM systems, microbumps may be used to provide power to components of the HBM systems and exchange signals with other devices (e.g., a host device). As power constraints of an HBM system increase, more microbumps may be used to fulfill the increased power constraints. For example, if, to meet a power target for an HBM system, the total current draw for the HBM system is to be doubled, then the quantity of microbumps may be doubled to achieve the desired current draw, as the amount of current through the microbumps may be limited. The area allocated for microbumps may also be limited, however, and it may be difficult to increase the quantity of microbumps to achieve the desired current draw. Additionally, while providing a higher voltage to the HBM system may provide additional power without increasing the current draw through the microbumps, the HBM system may lack components directed to the controlling or regulating power supplied to the HBM system or components thereof, which may make it difficult to provide an adequate power or voltage to the components of the HBM system. As such, alternative techniques for providing a higher power to the HBM system and for regulating the power of the HBM system may be desirable.

In accordance with examples as described herein, an HBM system may include a power management integrated circuit (PMIC) and a voltage regulator (e.g., a voltage regulator module) integrated within an interface die of the HBM system, or included as a separate circuit chip (e.g., or circuit chips) within the HBM system. Accordingly, the HBM system may be supplied a high voltage and may regulate the voltage to a desired power level, which may increase the total power available to the HBM system without increasing the quantity of microbumps. Additionally, or alternatively, a ground voltage may be supplied to the HBM system via a back (e.g., top) interface, which may reduce the quantity of microbumps at a front (e.g., frontside or bottom) interface. Additionally, or alternatively, a positive voltage may be supplied to the HBM system via the back interface. In some examples, a heatsink assembly may be configured to provide the ground voltage, the positive voltage, or both, to the HBM system (e.g., through the back interface).

Features of the disclosure are initially described in the context of systems and dies as described with reference to FIGS. 1 and 2. Features of the disclosure are described in the context of memory devices and systems as described with reference to FIGS. 3 through 9. These and other features of the disclosure are further illustrated by and described with reference to an apparatus diagram and flowcharts that relate to power management and delivery for high bandwidth memory as described with reference to FIGS. 1 through 9.

Figure 1:
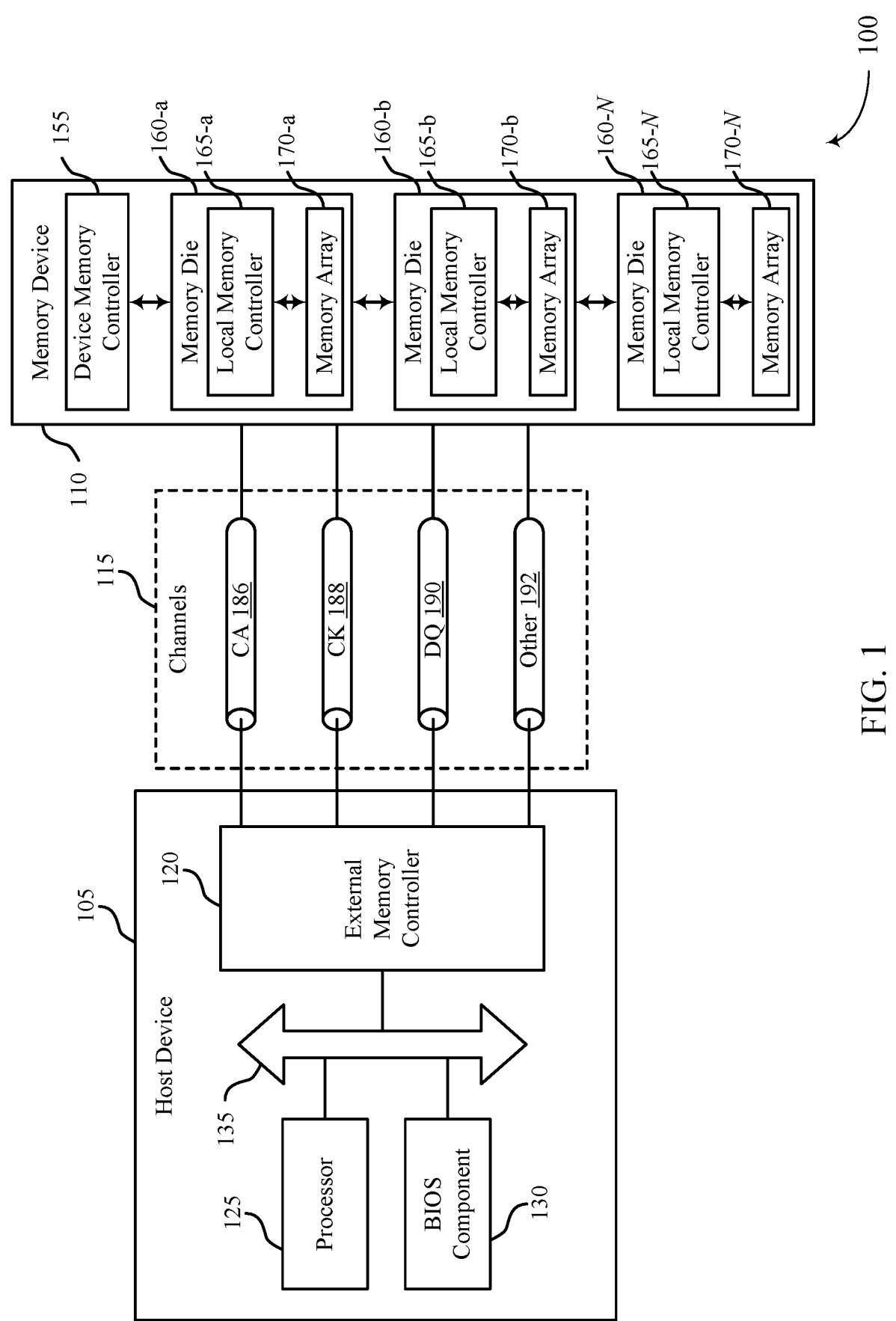
FIG. 1 illustrates an example of a system that supports power management and delivery for high bandwidth memory in accordance with examples as disclosed herein.

FIG. 1 illustrates an example of a system 100 that supports power management and delivery for high bandwidth memory in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

A memory die 160 may be an example of a two-dimensional (2D) array of memory cells or may be an example of a three-dimensional (3D) array of memory cells. In some examples, a 2D memory die 160 may include a single memory array 170. In some examples, a 3D memory die 160 may include two or more memory arrays 170, which may be stacked on top of one another or positioned next to one another (e.g., relative to a substrate). In some examples, memory arrays 170 in a 3D memory die 160 may be referred to as or otherwise include different sets (e.g., decks, levels, layers, dies). A 3D memory die 160 may include any quantity of stacked memory arrays 170 (e.g., two high, three high, four high, five high, six high, seven high, eight high). In some 3D memory dies 160, different decks may share a common access line such that some decks may share one or more of a word line, a digit line, or a plate line.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, the memory device 110 may be an example of an HBM device as described herein. The memory device 110 may contain multiple (e.g., eight) memory dies 160 (e.g., DRAM dies) and an interface die, which may be an example of a device memory controller 155, arranged in a vertical stack (e.g., relative to a substrate). The memory device 110 may use microbumps to provide power to components of the memory device 110 and exchange signals with other devices (e.g., the host device 105). As desired power amounts of the memory device 110 increase, however, more microbumps may be desired to fulfil the increase in power. As the area allocated for microbumps may be limited, however, it may be difficult to continually increase the quantity of microbumps. Additionally, the memory device 110 may lack components directed to the controlling or regulating power supplied to the memory device 110, which may make it difficult to provide a higher voltage to the memory device 110 and still delivering an appropriate power to components of the device 110. As such, alternative techniques for providing a higher power to the memory device 110 and for regulating power may be desirable.

In accordance with examples as described herein, the memory device 110 may include a PMIC and a voltage regulator (e.g., a voltage regulator module) integrated within the interface die of the memory device 110, or included as a separate chip (e.g., or chips) within the stack of the memory device 110. Accordingly, the memory device 110 may be supplied a higher voltage and may regulate the voltage to a desired power level without a proportional increase to the quantity of microbumps. Additionally, alternative power delivery options are explored a ground voltage may be supplied to the memory device 110 via a back (e.g., top) interface, which may reduce the quantity of microbumps at a front (e.g., bottom) interface. Additionally, or alternatively, a positive voltage may be supplied to the memory device 110 via the back interface, which may also reduce the quantity of microbumps at the front interface. In some examples, a heatsink assembly may be modified to supply the ground voltage, the positive voltage, or both, to the memory device 110, as described in more detail herein, with reference to FIGS. 5, 7, 8, and 9.

Figure 2:
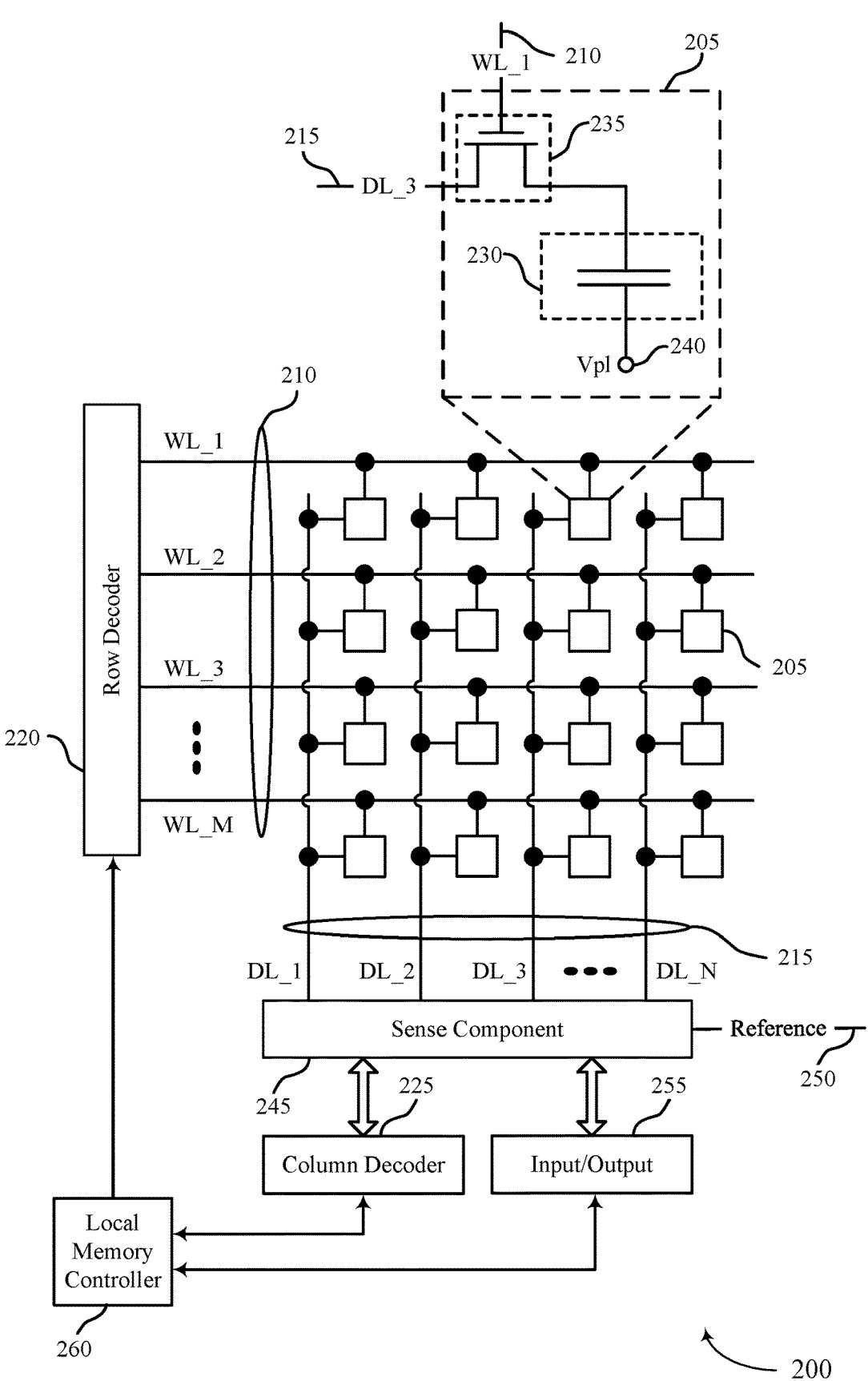
FIG. 2 illustrates an example of a memory die that supports power management and delivery for high bandwidth memory in accordance with examples as disclosed herein.

FIG. 2 illustrates an example of a memory die 200 that supports power management and delivery for high bandwidth memory in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, or a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

In some examples, the memory die 200 may be an example of memory die (e.g., a DRAM die) within an HBM device as described herein. The HBM device may contain multiple (e.g., eight) memory dies 200 (e.g., DRAM dies) and an interface die, which may be an example of a device memory controller 155, arranged in a vertical stack (e.g., relative to a substrate). The HBM device may use microbumps to provide power to components of the HBM device and exchange signals with other devices (e.g., the host device 105). As desired power values of the HBM device increase, however, more microbumps may be desired to fulfil the increased power. As the area allocated for microbumps may be limited, however, it may be difficult to increase the quantity of microbumps. Additionally, the HBM device may lack components directed to the controlling or regulating power supplied to the HBM device, which may make it difficult to provide a higher voltage to the HBM device. As such, alternative techniques for providing a higher power to the HBM device and for regulating power may be desirable.

In accordance with examples as described herein, the HBM device may include a PMIC and a voltage regulator (e.g., a voltage regulator module) integrated within the interface die of the HBM device, or included as a separate chip (e.g., or chips) within the stack of the HBM device. Accordingly, the HBM device may be supplied a higher voltage and may regulate the voltage to a desired power level without a proportional increase to the quantity of microbumps. Additionally, alternative power delivery options are explored a ground voltage may be supplied to the HBM device via a back (e.g., top) interface, which may reduce the quantity of microbumps at a front (e.g., bottom) interface. Additionally, or alternatively, a positive voltage may be supplied to the HBM device via the back interface, which may also reduce the quantity of microbumps at the front interface. In some examples, a heatsink assembly may be modified to supply the ground voltage, the positive voltage, or both, to the HBM device, as described in more detail herein, with reference to FIGS. 5, 7, 8, and 9.

Figure 3:
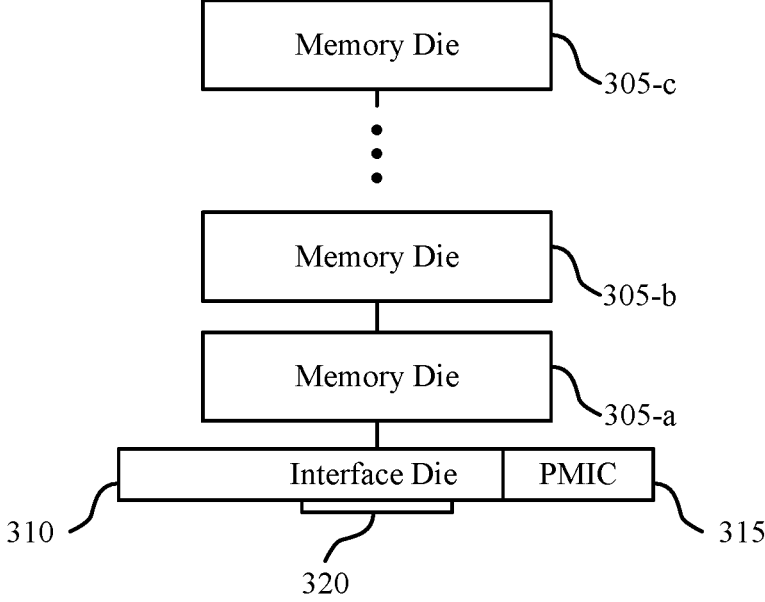
FIGS. 3 and 4 illustrate examples of a memory device that supports power management and delivery for high bandwidth memory in accordance with examples as disclosed herein.

FIG. 3 illustrates an example of a memory device 300 that supports power management and delivery for high bandwidth memory in accordance with examples as disclosed herein. The memory device 300 may be an example of an HBM device (e.g., or an HBM system), as described herein with reference to FIGS. 1 and 2. For example, the memory device 300 may be an example of a memory device 110 as described with reference to FIG. 1. The memory device 300 may include memory dies 305, such as memory die 305-a, memory die 305-b, and memory die 305-c, which may be examples of memory dies 160 or memory die 200 as described herein, with reference to FIGS. 1 and 2.

In some examples, the memory device 300 may have one or more components arranged in a stack (e.g., a vertical stack), where each component may be stacked on top of a next component as illustrated in FIG. 3. The top of the stack may include the memory dies 305, such as the memory die 305-c, the memory die 305-b, and the memory die 305-a. More memory dies 305 not shown may also be part of the stack, and, in some examples, the memory device 300 may include eight memory dies 305. The device 300 may include an interface die 310 below the memory die 305-a in the stack. Additionally, the device 300 may have microbumps 320 below the interface die 310 and coupled with the interface die 310.

Each memory die 305 (e.g., memory die 305-a, memory die 305-b, memory die 305-c) may a contain a plurality of memory cells that may each store a charge representative of programmable states in a capacitor. In some examples, each memory die 305 may be an example of DRAM die and may include a capacitor that includes a dielectric material to store a charge representative of the programmable states. The interface die 310 may act as an interface to access each of the memory die 305-a, the memory die 305-b, the memory die 305-c, and other memory dies 305 of the memory device 300.

In some examples, the microbumps 320 may be used to provide a voltage to the device 300 or components thereof. For example, some or all of the microbumps 320 may be directed to supplying power to the memory dies 305 and cores (e.g., VDDC microbumps 320), supplying power to input/output (IO) components (e.g., VDDQ micro bumps 320), supplying power to cores of the memory dies 305 (e.g., VPP microbumps 320), supplying a low voltage to IO components (e.g., VDDQL microbumps 320), or any combination thereof. Additionally, or alternatively, the microbumps 320 may exchange signaling between the device 300 (e.g., the interface die 310) and another device (e.g., a host device). For example, the microbumps 320 may communicate an access command from another device to the device 300. The interface die 310 may operate to perform an access operation at a memory die 305 based on the access command and may output a signal through the microbumps 320 in response.

In some cases, additional power may be desired for the device 300 to increase a capacity or a bandwidth of the device, for example. While more microbumps may be desired to provide additional power, the area allocated for microbumps at the device 300 may be limited, and it may be difficult to increase the quantity of microbumps to provide the additional power. Additionally, the device 300 may lack components directed to the controlling or regulating power supplied to the device 300, which may make it difficult to provide a higher voltage to the device 300 through the existing microbumps 320 and still provide adequate power to each component of the device 300. As such, alternative techniques for providing a higher power to the HBM system and for regulating power may be desirable.

In accordance with examples as described herein, the device 300 may include a PMIC 315. In some examples, the PMIC 315 may be included within (e.g., as part of) the interface die 310. Additionally, or alternatively, the PMIC 315 may be included alongside the interface die 310 in the stack. The PMIC 315 may manage power provided to each component of the device 300. Additionally, the PMIC 315 may regulate a voltage provided to the device 300. For example, the PMIC 315 may include a voltage regulator (e.g., a voltage regulator module), and the voltage regulator may adjust (e.g., regulate) a voltage provided to each component of the device 300 to a desired or appropriate voltage. By providing a higher voltage, current provided to the device 300 through the microbumps 320 may be reduced while providing the same amount of power. Accordingly, the quantity of microbumps 320 (e.g., microbumps 320 for providing power or a ground voltage) may be reduced while still providing the same amount of power. Conversely, the quantity of microbumps 320 may be kept the same or increased, and more power may be provided to the device 300.

Figure 4:
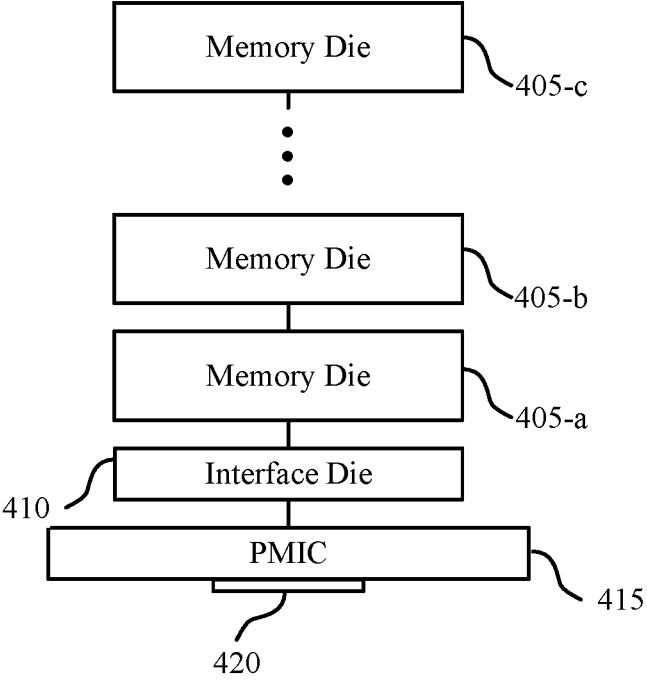

FIG. 4 illustrates an example of a memory device 400 that supports power management and delivery for high bandwidth memory in accordance with examples as disclosed herein. The memory device 400 may be an example of a memory device (e.g., an HBM device) as described herein with reference to FIGS. 1 through 3. For example, the memory device 400 may be an example of a memory device 110 or a memory device 300 as described with reference to FIGS. 1 and 3, respectively. The memory device 400 may include memory dies 405, such as memory die 405-a, memory die 405-b, and memory die 405-c, which may be examples of memory dies as described herein, with reference to FIGS. 1 through 3.

In some examples, the memory device 400 may have one or more components arranged in a stack (e.g., a vertical stack), where each component may be stacked on top of a next component as illustrated in FIG. 4. The top of the stack may include the memory dies 405, such as the memory die 405-c, the memory die 405-b, and the memory die 405-a. More memory dies 405 not shown may also be part of the stack, and, in some examples, the memory device 400 may include eight memory dies 405. The device 400 may include an interface die 410 below the memory die 405-a in the stack. Additionally, the device 400 may have microbumps 420 below the interface die 410.

Each memory die 405 (e.g., memory die 405-*a*, memory die 405-*b*, memory die 405-*c*) may a contain a plurality of memory cells that may each store a charge representative of programmable states in a capacitor. In some examples, each memory die 405 may be an example of DRAM die and may include a capacitor that includes a dielectric material to store a charge representative of the programmable states. The interface die 410 may act as an interface to access each of the memory die 405-*a*, the memory die 405-*b*, the memory die 405-*c*, and other memory dies 405 of the memory device 400.

In some examples, the microbumps 420 may be used to provide a voltage to the device 400 or components thereof. For example, the device 400 some or all of the microbumps 420 may be directed to supplying a ground connection to the memory dies 405 (e.g., VSS microbumps 420), supplying power to the memory dies 405 and cores (e.g., VDDC microbumps 420), supplying power to input/output (IO) components (e.g., VDDQ microbumps 420), supplying power to cores of the memory dies 405 (e.g., VPP microbumps 420), supplying a low voltage to IO components (e.g., VDDQL microbumps 420), or any combination thereof. Additionally, or alternatively, the microbumps 420 may exchange signaling between the device 400 (e.g., the interface die 410) and another device (e.g., a host device). For example, the microbumps 420 may communicate an access command from another device to the device 400. The interface die 410 may operate to perform an access operation at a memory die 405 based on the access command and may output a signal through the microbumps 420 in response.

In some cases, additional power may be desired for the device 400 to increase a capacity or a bandwidth of the device, for example. While more microbumps 420 may be desired to provide additional power or bandwidth, as the area allocated for microbumps at the device 400 may be limited, it may be difficult to increase the quantity of microbumps 420. Additionally, the device 400 may lack components directed to the controlling or regulating power supplied to the device 400, which may make it difficult to provide a higher voltage to the device 400 through the existing microbumps 420 and still provide adequate power to each component of the device 400. As such, alternative techniques for providing a higher power to the HBM system and for regulating power may be desirable.

In accordance with examples as described herein, the device 400 may include a PMIC 415. In some examples, the PMIC 415 may be included within the stack as a separate chip from the interface die 410, and may be positioned below the interface die 410. Including the PMIC 415 as a separate chip may allow for a larger PMIC 415 (e.g., relative to device 300). However, this may result in a larger change to the structure of the device 400 relative to other devices (e.g., conventional HBM devices), such as by altering the height of the device. The microbumps 420 may be positioned below the PMIC 415 and coupled with the PMIC 415. The PMIC 415 may manage power and may regulate a voltage provided to the device 400. For example, the PMIC 415 may include a voltage regulator (e.g., a voltage regulator module), and the voltage regulator may adjust (e.g., regulate) a voltage provided to each component of the device 400 to a desired or appropriate voltage.

By including the PMIC 415, a higher external voltage may be provided to the device 400, and current provided to the device 400 through the microbumps 420 may be reduced while providing the same amount of power. Accordingly, the quantity of microbumps 420 (e.g., microbumps 420 for providing power or a ground voltage) may be reduced while still providing the same amount of power. Conversely, the quantity of microbumps 420 may be kept the same or increased, and more power may be provided to the device 400.

Figure 5:
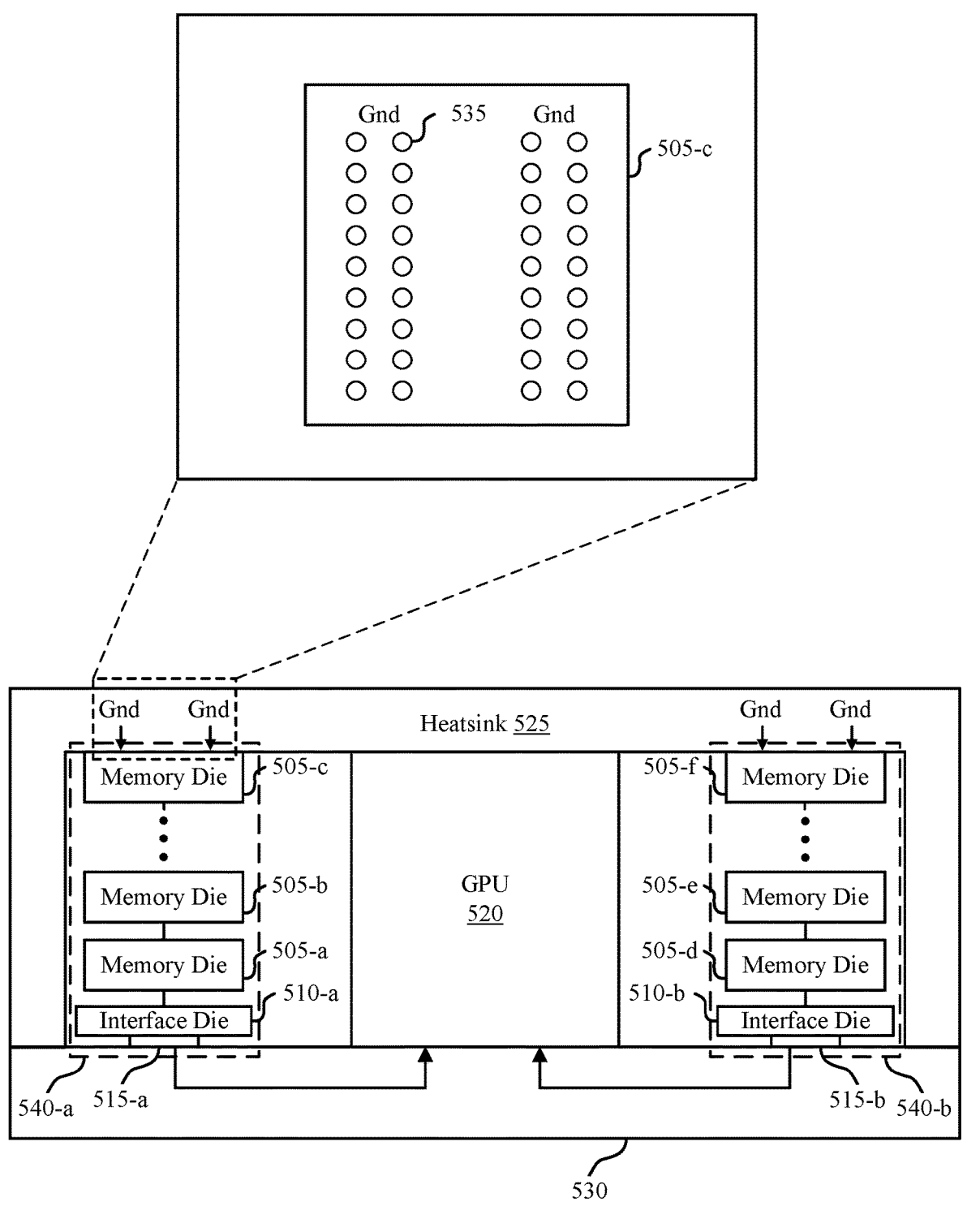
FIG. 5 illustrates an example of a system that supports power management and delivery for high bandwidth memory in accordance with examples as disclosed herein.

FIG. 5 illustrates an example of a system 500 that supports power management and delivery for high bandwidth memory in accordance with examples as disclosed herein. The system 500 may incorporate aspects of the system 100, the memory die 200, the memory device 300, and the memory device 400. For example, the system 500 may include memory dies 505 (e.g., a memory die 505-*a*, a memory die 505-*b*, a memory die 505-*c*, a memory die 505-*d*, a memory die 505-*e*, and a memory die 505-*f*), an interface die 510-*a* and an interface die 510-*b*, and microbumps 515-*a* and microbumps 515-*b*, which may be examples of corresponding devices as described herein, with reference to FIGS. 1 through 4.

In some examples, the memory die 500-*a*, the memory die 500-*b*, the memory die 500-*c*, the interface die 510-*a*, and the microbumps 515-*a* may form or be part of a memory device 540-*a*, which may be an example of a memory device (e.g., an HBM device) as described herein, with reference to FIGS. 1 through 4. Similarly, the memory die 500-*d*, the memory die 500-*e*, the memory die 500-*f*, the interface die 510-*b*, and the microbumps 515-*b* may form or be part of a memory device 540-*b*, which may be an example of a memory device (e.g., an HBM device) as described herein, with reference to FIGS. 1 through 4.

The system 500 may include a GPU 520. The GPU 520 may store and retrieve data from the memory device 540-*a* or the memory device 540-*b*, for example, by exchanging signaling with the interface die 510-*a* and the interface die 510-*b* through the microbumps 515-*a* and the microbumps 515-*b*, respectively. For example, the memory device 540-*a* and the memory device 540-*b* may receive or output signals through signal microbumps, which may be a subset of the microbumps 515-*a* and the microbumps 515-*b*. While a GPU 520 is used as an example, the GPU 520 may be another device (e.g., a CPU) that may store and retrieve data from the memory dies 505.

In some examples, the signaling may be exchanged between the GPU 520 and the microbumps 515-*a* or the microbumps 515-*b* via an interposer 530, which may serve as a base or an interface between components of the system 500. The interposer 530 may be connected to a power supply (not shown), and the interposer 530 may provide power to the memory device 540-*a* and the memory device 540-*b* through the microbumps 515-*a* and the microbumps 515-*b*, respectively. For example, the interposer 530 may provide power through power microbumps, which may be a subset of the microbumps 515-*a* and the microbumps 515-*b*. In some examples, the interposer 530 may be an example of silicon interposer or an organic substrate interposer (e.g., a substrate) and may be connected to a heatsink 525 (e.g., a heatsink assembly).

The heatsink 525 may be a metal component which may transfer heat generated by components of the system 500 (e.g., the GPU 520, the memory device 540-*a*, the memory device 540-*b*, or other components) away from the components generating heat, which may reduce an operating temperature of the components of the system 500. In accordance with examples as described herein, the heatsink 525 may be modified to provide a voltage to the memory device 540-*a* and the memory device 540-*b*. For example, the heatsink 525 may provide a ground voltage (e.g., a ground signal) to the memory device 540-*a* and the memory device 540-*b* via a back (e.g., top) interface of the memory device 540-*a* and the memory device 450-*b*.

To provide the ground voltage to the memory device 540-*a* and the memory device 540-*b*, the heatsink 525 may be connected to a ground voltage (e.g., grounded). In some examples, the ground voltage may be provided via connections 535 (e.g., connection pads or electrodes) coupled with a back (e.g., top) interface of the memory die 505-*c* and the memory die 505-*f*. The connections 535 may be in contact (e.g., or coupled with) the heatsink 525, thereby providing the ground voltage to the memory device 540-*a* and the memory device 540-*b*. Accordingly, the quantity of microbumps 515-*a* and microbumps 515-*b* dedicated to providing a ground voltage (e.g., VSS microbumps 515) to the memory device 540-*a* and the memory device 540-*b* may be reduced or eliminated. This may decrease the total quantity of microbumps 515-*a* and microbumps 515-*b*, which may increase the area available for other types of microbumps 515-*a* and microbumps 515-*b*.

In some examples, a testing probe (e.g., a probe chuck) may be modified in a similar manner as the heatsink 525 to provide a voltage to the memory device 540-*a* and the memory device 540-*b* during testing. For example, the testing probe may provide a ground voltage to the memory device 540-*a* and the memory device 540-*b* via a back (e.g., top) interface. This may allow for testing of the memory device 540-*a* and the memory device 540-*b* even if the memory device 540-*a* and the memory device 540-*b* lack power microbumps for providing a ground voltage through the front (e.g., bottom) interface.

Figure 6:
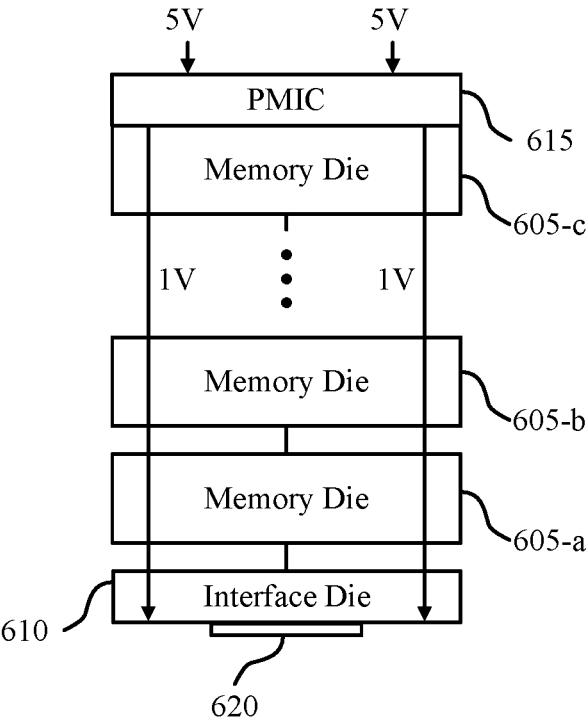
FIG. 6 illustrates an example of a memory device that supports power management and delivery for high bandwidth memory in accordance with examples as disclosed herein.

FIG. 6 illustrates an example of a memory device 600 that supports power management and delivery for high bandwidth memory in accordance with examples as disclosed herein. The memory device 600 may be an example or implement aspects of a memory device (e.g., an HBM device) as described herein, with reference to FIGS. 1 through 5. For example, the memory device 600 may include memory dies 605, such as memory die 605-*a*, memory die 605-*b*, and memory die 605-*c*, which may be examples of memory dies as described herein, with reference to FIGS. 1 through 5. Additionally, the memory device 600 may include an interface die 610, a PMIC 615, and microbumps 620, which may be examples of corresponding devices as described herein, with reference to FIGS. 1 through 5.

In some examples, the memory device 600 may have one or more components arranged in a stack (e.g., a vertical stack), where each component may be stacked on top of a next component as illustrated in FIG. 6. The top of the stack may include the memory dies 605, such as the memory die 605-*c*, the memory die 605-*b*, and the memory die 605-*a*. More memory dies 605 not shown may also be part of the stack, and, in some examples, the memory device 600 may include eight memory dies 605. The interface die 610 may be positioned below the memory die 605-*a* in the stack. Additionally, the microbumps 620 may be positioned below the interface die 610 and may be coupled with the interface die 610 to provide power or signals to the memory device 600.

Each memory die 605 (e.g., memory die 605-*a*, memory die 605-*b*, memory die 605-*c*) may a contain a plurality of memory cells that may each store a charge representative of programmable states in a capacitor. In some examples, each memory die 605 may be an example of DRAM die and may include a capacitor that includes a dielectric material to store a charge representative of the programmable states. The interface die 610 may act as an interface to access each of the memory die 605-*a*, the memory die 605-*b*, the memory die 605-*c*, and other memory dies 605 of the memory device 600.

In some examples, the microbumps 620 may be used to provide a voltage to the memory device 600 or components thereof. For example, the memory device 600 some or all of the microbumps 620 may be directed to supplying a ground connection to the memory dies 605 (e.g., VSS microbumps 620), supplying power to the memory dies 605 and cores (e.g., VDDC microbumps 620), supplying power to input/output (IO) components (e.g., VDDQ microbumps 620), supplying power to cores of the memory dies 605 (e.g., VPP microbumps 620), supplying a low voltage to IO components (e.g., VDDQL microbumps 620), or any combination thereof. Additionally, or alternatively, the microbumps 620 may exchange signaling between the memory device 600 (e.g., the interface die 610) and another device (e.g., a host device). For example, the microbumps 620 may communicate an access command from another device to the memory device 600. The interface die 610 may operate to perform an access operation at a memory die 605 based on the access command and may output a signal through the microbumps 620 in response.

In some cases, additional power may be desired for the memory device 600 to increase a capacity or a bandwidth of the device, for example. While more microbumps may be desired to provide additional power or bandwidth, as the area allocated for microbumps 620 at the memory device 600 may be limited, it may be difficult to increase the quantity of microbumps 620. Additionally, the memory device 600 may lack components directed to the controlling or regulating power supplied to the memory device 600, which may make it difficult to provide a higher voltage to the memory device 600 through the existing microbumps 620 and still provide adequate power to each component of the memory device 600. As such, alternative techniques for providing a higher power to the HBM system and for regulating power may be desirable.

In accordance with examples as described herein, the device PMIC 615 may provide power to components of the memory device 600 through a back (e.g., top) interface. For example, the PMIC 615 may be included at the top of the stack, such as positioned above the memory die 605-*c*. The PMIC 615 may manage power provided to each component of the memory device 600. For example, the PMIC 615 may receive an external voltage from an external device (e.g., a heatsink assembly, as described herein) and regulate the external voltage to provide an internal voltage to components of the memory device 600, such as the memory dies 605 and the interface die 610.

In some examples, the PMIC 615 may include a voltage regulator (e.g., a voltage regulator module) to adjust (e.g., regulate) a voltage provided to components of the memory device 600 to a desired or appropriate voltage. For example, the PMIC 615 may include receive a 5 Volt (5V) external voltage, and the PMIC 615 may regulate (e.g., through the voltage regulator) voltage to provide a 1 Volt (1V) internal voltage to the memory dies 605, and the interface die 610. In some cases, the PMIC 615 may also provide a ground voltage (e.g., a ground signal) to components of the memory device 600. For example, the PMIC 615 may receive a positive (e.g., 5V) voltage and a ground voltage (e.g., Gnd) via a heatsink assembly as described in more detail herein, with reference to FIGS. 7 through 9.

By providing a voltage via the PMIC 615 through the back interface, the quantity of power microbumps 620 (e.g., VSS, VDDC, VDDQ, VPP, and VDDQL microbumps 620) may be reduced or eliminated while still providing power to the memory device 600. This may increase the area available for other types (e.g., signal) of microbumps 620. Additionally, or alternatively, providing voltage via the PMIC 615 through the back interface may allow for a higher voltage to be provided to the memory device 600, which may increase the power available for the memory device 600. This may result in a larger overhaul of a memory system (e.g., an HBM system) relative to other devices (e.g., device 300 or device 400), however, as the memory system may be modified to provide power to the memory device 600 via the back interface.

Figure 7:
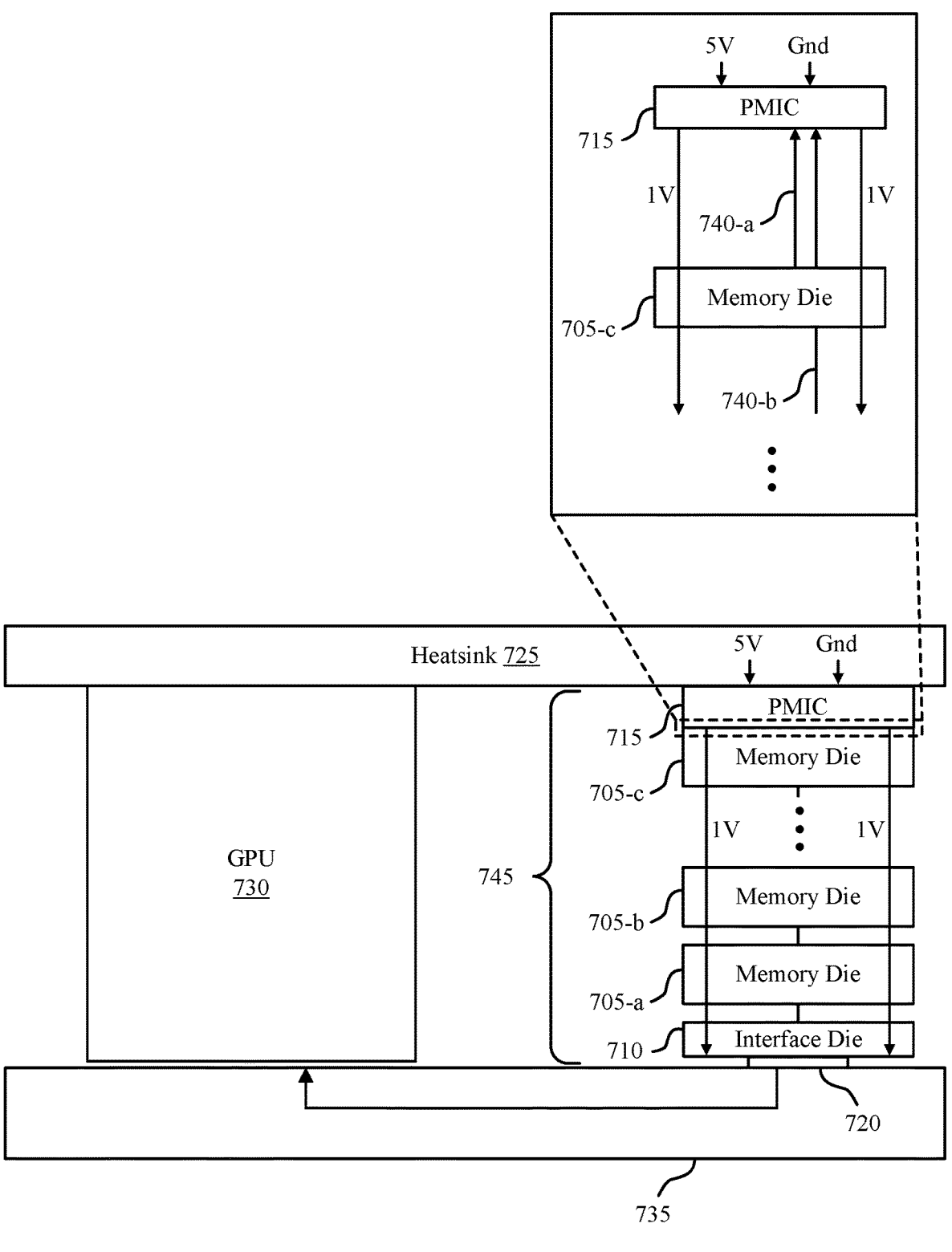
FIGS. 7 through 9 illustrate examples of a system that supports power management and delivery for high bandwidth memory in accordance with examples as disclosed herein.

FIG. 7 illustrates an example of a system 700 that supports power management and delivery for high bandwidth memory in accordance with examples as disclosed herein. The system 700 includes a memory device 745, which may be or incorporate aspects of a memory device (e.g., an HBM device) as described herein, with reference to FIGS. 1 through 6. For example, the memory device 745 may include memory dies 705 (e.g., a memory die 705-*a*, a memory die 705-*b*, a memory die 705-*c*, a memory die 705-*d*, a memory die 705-*e*, and a memory die 705-*f*), an interface die 710, a PMIC 715, and microbumps 720, which may be examples of corresponding devices as described herein, with reference to FIGS. 1 through 6. Additionally, the system 700 may include a heatsink 725 (e.g., a heatsink assembly), a GPU 730, and an interposer 735, which may be examples of corresponding devices as described herein, with reference to FIG. 5.

The GPU 730 may store and retrieve data from the memory device 745, for example, by exchanging signaling with the interface die 710 through the microbumps 720. For example, the memory device 745 may receive or output signals through signal microbumps, which may be a subset (e.g., or all) of the microbumps 720. While a GPU 730 is used as an example, the GPU 730 may be another device (e.g., a CPU) that may store and retrieve data from the memory dies 705. In some examples, the signaling may be exchanged between the GPU 730 and the microbumps 715-*a* or the microbumps 715-*b* via the interposer 735, which may serve as a base or an interface between components of the system 700. In some examples, the interposer 735 may be an example of silicon interposer or an organic substrate interposer and may be connected to the heatsink 725.

The heatsink 725 may be a metal component which may transfer heat generated by components of the system 700 (e.g., the GPU 730, the memory device 745, or other components) away from the components generating heat, which may reduce an operating temperature of the components of the system 700. In accordance with examples as described herein, the heatsink 725 may be modified to provide a voltage to the memory device 745. For example, the heatsink 725 may provide a ground voltage (e.g., a ground signal, Gnd) and a positive voltage (e.g., 5V) to the memory device 745 via a back (e.g., top) interface of the memory device 745.

To provide the ground voltage and the positive voltage to the memory device 745, the heatsink 725 may be partitioned into one or more portions connected to a ground voltage (e.g., grounded), and one or more portions connected to a positive voltage (e.g., an external voltage). Possible partitions of the heatsink 725 are described in more detail herein, with reference to FIGS. 8 and 9.

In some examples, the PMIC 715 may be programed (e.g., controlled, operated, or modified) by the memory die 705-*c* or another component of the memory device 745 via one or more connections 740. For example, settings for the PMIC 715 may be programmed (e.g., coded or hard-coded) to the memory die 705-*c*, and the memory die 705-*c* may program the PMIC 715 via a connection 740-*a*, which may be a fuse (e.g., a fuse dedicated to the PMIC 715). Additionally, or alternatively, the PMIC 715 may be programed by the memory device 745 or another component thereof via a connection 740-*b*, which may be a P1500 connection or a fuse. This may allow for tuning of the PMIC 715 by the memory device 745.

Accordingly, the quantity of microbumps 720 dedicated to providing a ground voltage or a positive voltage (e.g., VSS, VDDC, VDDQ, VPP, and VDDQL microbumps 720) to the memory device 745 may be reduced or eliminated. This may decrease the total quantity of microbumps 720, which may increase the area available for other types of microbumps 720 (e.g., signal microbumps 720). Additionally, or alternatively, providing voltage via the PMIC 715 through a back interface of the memory device 745 may allow for a higher voltage to be provided to the memory device 745, which may increase the power available for the memory device 745.

By providing a voltage via the PMIC 715 through a back interface of the device 745, the quantity of power microbumps 720 (e.g., VSS, VDDC, VDDQ, VPP, and VDDQL microbumps 720) may be reduced or eliminated while still providing power to the memory device 745. This may increase the area available for other types (e.g., signal) of microbumps 720 (e.g., relative to system 500).

In some examples, a testing probe (e.g., a probe chuck) may be modified in a similar manner as the heatsink 725 to provide a voltage to the memory device 745 during testing. For example, the testing probe may provide a ground voltage and a positive voltage to the memory device 745 via the back (e.g., top) interface of the memory device 745. This may allow for testing of the memory device 745 even if the memory device 745 lacks power microbumps for providing a ground voltage or a positive voltage through the front (e.g., bottom) interface.

Figure 8:
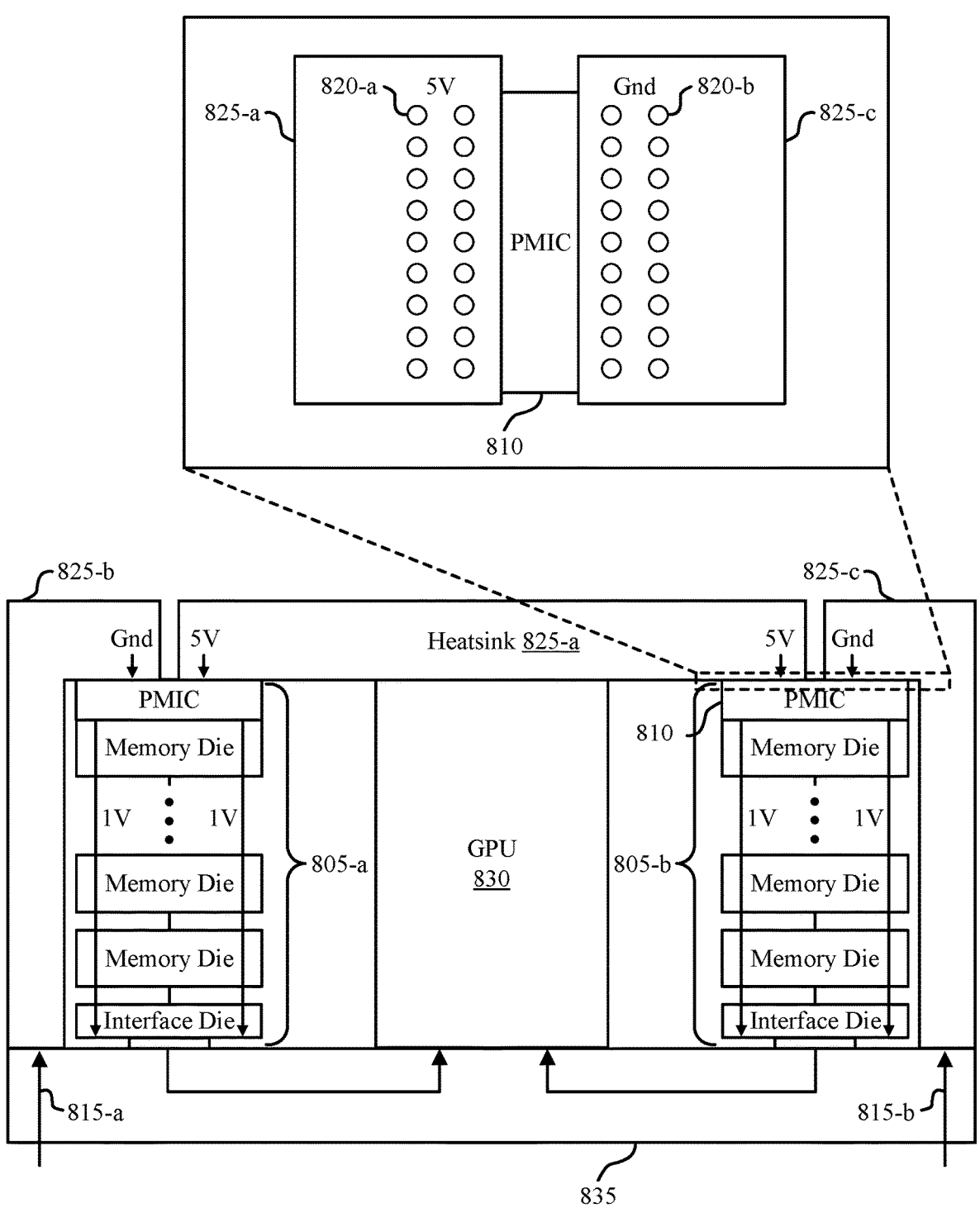

FIG. 8 illustrates an example of a system 800 that supports power management and delivery for high bandwidth memory in accordance with examples as disclosed herein. The system 800 may include a memory device 805-*a* and a memory device 805-*b*, which may be or incorporate aspects of memory devices (e.g., HBM devices) as described herein, with reference to FIGS. 1 through 7. For example, the memory device 805-*a* and the memory device 805-*b* may include memory dies, an interface dies, and microbumps, which may be examples of corresponding devices as described herein, with reference to FIGS. 1 through 7. Additionally, the system 800 may include a heatsink 825-*a*, a heatsink 825-*b*, a heatsink 825-*c*, a GPU 830, and an interposer 835, which may be examples of corresponding devices as described herein, with reference to FIGS. 5 and 7.

The GPU 830 may store and retrieve data from the memory device 805-*a* and the memory device 805-*b*, for example, by exchanging signaling with an interface die through microbumps of the memory device 805-*a* and the memory device 805-*b*. For example, the memory device 805-*a* and the memory device 805-*b* may receive or output signals through signal microbumps, which may be a subset (e.g., or all) of the microbumps of the memory device 805-*a* and the memory device 805-*b*. While a GPU 830 is used as an example, the GPU 830 may be another device (e.g., a CPU) that may store and retrieve data from the memory dies 805. In some examples, the signaling may be exchanged between the GPU 830 and the memory device 805-*a* and the memory device 805-*b* via the interposer 835, which may serve as a base or an interface between components of the system 800. In some examples, the interposer 835 may be an example of silicon interposer or an organic substrate interposer and may be connected to the heatsink 825-*a*, the heatsink 825-*b*, the heatsink 825-*c*, or a combination thereof.

The heatsink 825-*a*, the heatsink 825-*b*, and the heatsink 825-*c* may be metal components of a heatsink assembly, which may transfer heat generated by components of the system 800 (e.g., the GPU 830, the memory device 805-*a*, the memory device 805-*b*, or other components) away from the components generating heat. In accordance with examples as described herein, the heatsink assembly may be modified to provide a voltage to the memory device 805-*a* and the memory device 805-*b*. For example, the heatsink 825-*b* and the heatsink 825-*c* may provide and a positive voltage (e.g., 5V) to the memory device 805-*a* and the memory device 805-*b* via a back (e.g., top) interface of the memory device 805-*a* and the memory device 805-*b*. Similarly, the heatsink 825-*b* and the heatsink 825-*c* may provide a ground voltage (e.g., a ground signal, Gnd) to the memory device 805-*a* and the memory device 805-*b* via the back (e.g., top) interface of the memory device 805-*a* and the memory device 805-*b*.

To provide the ground voltage and the positive voltage to the memory device 805-*a* and the memory device 805-*b*, the heatsink 825-*a*, the heatsink 825-*b*, and the heatsink 825-*c* may be provided different (e.g., external) voltages. For example, the heatsink 825-*a* may be a dome structure extending towards and away from the surface shown in FIG. 8, and the heatsink 825-*a* may be provided a ground voltage (e.g., grounded) at the front portion, back portion, or both, of the heatsink 825-*a* (e.g., via the interposer 835). Similarly, the heatsink 825-*b* and the heatsink 825-*c* may be provided a positive voltage (e.g., 5V) by an external voltage 815-*a* and 815-*b*, respectively (e.g., via the interposer 835).

In some examples, the positive voltage may be provided to the memory device 805-*b* via connections 820-*a* (e.g., connection pads or electrodes) located at a back interface of the PMIC 810 and coupled with the heatsink 825-*a*. Similarly, the ground voltage may be provided to the memory device 805-*b* via connections 820-*b* (e.g., connection pads or electrodes) located at the back interface of the PMIC 810 and coupled with the heatsink 825-*c*. Similar connections 820 may be present on the back interface of the memory device 805-*a*. Therefore, the heatsink 825-*a*, the heatsink 825-*b*, and the heatsink 825-*c* may provide the positive voltage and the ground voltage to the memory device 805-*a* and the memory device 805-*b*.

As the heatsink assembly may provide a positive voltage and a ground voltage, there may be a gap between heatsink 825-*a* and heatsink 825-*b* or heatsink 825-*c*. This may avoid shorting the heatsink 825-*a* and heatsink 825-*b* or heatsink 825-*c*. The gap may be larger or smaller than shown in FIG. 8. Additionally or alternatively, an insulating material may fill the gap (e.g., to cover the memory device 805-*a* and the memory device 805-*b*).

Accordingly, the quantity of microbumps dedicated to providing a ground voltage or a positive voltage (e.g., VSS, VDDC, VDDQ, VPP, and VDDQL microbumps) to the memory device 805-*a* and the memory device 805-*b* may be reduced or eliminated. This may decrease the total quantity of microbumps, which may increase the area available for other types of microbumps (e.g., signal microbumps). Additionally, or alternatively, providing voltage via the PMIC 810 through a back interface of the memory device 805-*a* and the memory device 805-*b* may allow for a higher voltage to be provided to the memory device 805-*a* and the memory device 805-*b*, which may increase the power available for the memory device 805-*a* and the memory device 805-*b*.

Figure 9:
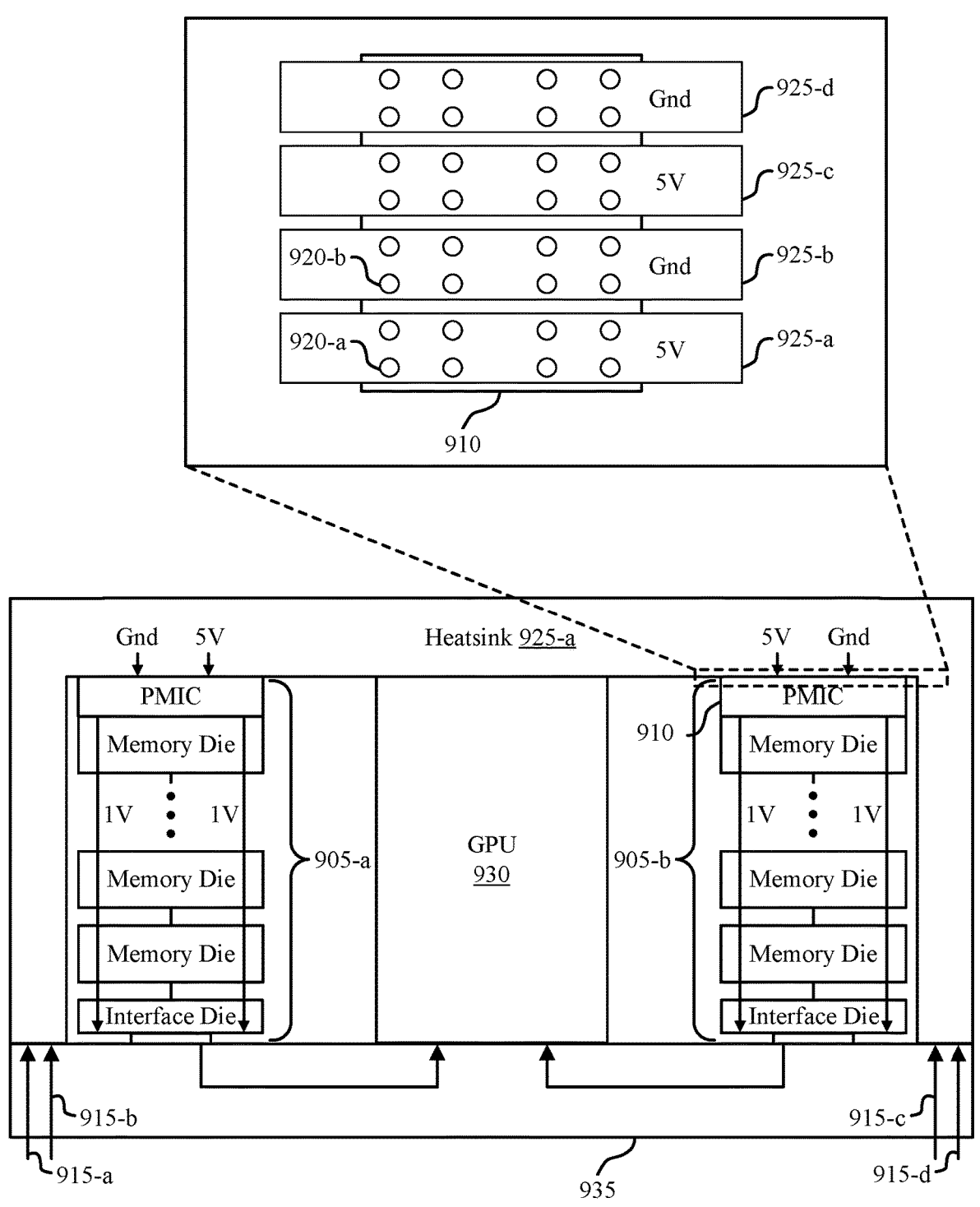

FIG. 9 illustrates an example of a system 900 that supports power management and delivery for high bandwidth memory in accordance with examples as disclosed herein. The system 900 may include a memory device 905-*a* and a memory device 905-*b*, which may be or incorporate aspects of memory devices (e.g., HBM devices) as described herein, with reference to FIGS. 1 through 8. For example, the memory device 905-*a* and the memory device 905-*b* may include memory dies, an interface dies, and microbumps, which may be examples of corresponding devices as described herein, with reference to FIGS. 1 through 7. Additionally, the system 900 may include a heatsink 925-*a*, a heatsink 925-*b*, a heatsink 925-*c*, a heatsink 925-*d*, a GPU 930, and an interposer 935, which may be examples of corresponding devices as described herein, with reference to FIGS. 5, 7 and 8.

The GPU 930 may store and retrieve data from the memory device 905-*a* and the memory device 905-*b*, for example, by exchanging signaling with an interface die through microbumps of the memory device 905-*a* and the memory device 905-*b*. For example, the memory device 905-*a* and the memory device 905-*b* may receive or output signals through signal microbumps, which may be a subset (e.g., or all) of the microbumps of the memory device 905-*a* and the memory device 905-*b*. While a GPU 930 is used as an example, the GPU 930 may be another device (e.g., a CPU) that may store and retrieve data from the memory dies 905. In some examples, the signaling may be exchanged between the GPU 930 and the memory device 905-*a* and the memory device 905-*b* via the interposer 935, which may serve as a base or an interface between components of the system 900. In some examples, the interposer 935 may be an example of silicon interposer or an organic substrate interposer and may be connected to the heatsink 925-*a*, the heatsink 925-*b*, the heatsink 925-*c*, the heatsink 925-*d*, or any combination thereof.

The heatsink 925-*a*, the heatsink 925-*b*, the heatsink 925-*c*, and the heatsink 925-*d* may be metal components of a heatsink assembly which may transfer heat generated by components of the system 900 (e.g., the GPU 930, the memory device 905-*a*, the memory device 905-*b*, or other components) away from the components generating heat. In accordance with examples as described herein, the heatsink assembly may be modified to provide a voltage to the memory device 905-*a* and the memory device 905-*b*. For example, the heatsink 925-*a*, the heatsink 925-*b*, the heatsink 925-*c*, and the heatsink 925-*d* may be arranged in an interleaving pattern, where a first portion of the heatsinks 925 provide (e.g., are connected to) a positive voltage and are interleaved between a second portion of the heatsinks 925 that provide (e.g., are connected to) a ground voltage. While four heatsinks 925 are illustrated, the heatsink assembly may contain a different number of heatsinks 925.

In some examples, the heatsink 925-*a* and the heatsink 925-*c* may provide and a positive voltage (e.g., 5V) to the memory device 905-*a* and the memory device 905-*b* via a back (e.g., backside or top) interface of the memory device 905-*a* and the memory device 905-*b*. Similarly, the heatsink 925-*b* and the heatsink 925-*d* may provide a ground voltage (e.g., a ground signal, Gnd) to the memory device 905-*a* and the memory device 905-*b* via the back interface of the memory device 905-*a* and the memory device 905-*b*.

To provide the ground voltage and the positive voltage to the memory device 905-*a* and the memory device 905-*b*, the heatsink 925-*a*, the heatsink 925-*b*, the heatsink 925-*c*, and the heatsink 925-*d* may be provided different (e.g., external) voltages. For example, the heatsink 925-*a* and the heatsink 925-*c* may be provided a positive voltage (e.g., 5V) through an external voltage 915-*a* and an external voltage 915-*c* (e.g., via the interposer 935). Similarly, the heatsink 925-*b* and the heatsink 925-*d* may be provided a ground voltage (e.g., Gnd) through an external voltage 915-*b* and an external voltage 915-*d* (e.g., via the interposer 935).

By partitioning the heatsink assembly in an interleaving pattern as shown in FIG. 9, the heatsinks 925 may be provided with the ground voltage and the positive voltage via similar locations (e.g., the sides of the heatsink assembly). This may be in contrast to the heatsink assembly described with reference to FIG. 8, which may provide a ground voltage via the sides of the heatsink assembly, and a positive voltage via the front or back of the heatsink assembly. In some cases, however, the heatsink assembly described in FIG. 9 may require more voltage or ground sources (e.g., external voltages 915) relative to the heatsink assembly described with reference to FIG. 8.

In some examples, the positive voltage may be provided to the memory device 905-*b* via connections 920-*a* (e.g., connection pads or electrodes) located at a back interface of the PMIC 910 and coupled with the heatsink 925-*a* or the heatsink 925-*c*. Similarly, the ground voltage may be provided to the memory device 905-*b* via connections 920-*b* (e.g., connection pads or electrodes) located at the back interface of the PMIC 910 and coupled with the heatsink 925-*b* or the heatsink 920-*d*. Similar connections 920 may be present on the back interface of the memory device 905-*a*. Therefore, the heatsink 925-*a*, the heatsink 925-*b*, the heatsink 925-*c*, and the heatsink 925-*d* may provide the positive voltage and the ground voltage to the memory device 905-*a* and the memory device 905-*b*.

As the heatsink assembly may provide a positive voltage and a ground voltage, there may be a gap between heatsink 825-*a* and heatsink 825-*b* or heatsink 825-*c*. This may avoid shorting the heatsink 825-*a* and heatsink 825-*b* or heatsink 825-*c*. The gap may be larger or smaller than shown in FIG. 8. Additionally or alternatively, an insulating material may fill the gap (e.g., to cover the memory device 805-*a* and the memory device 805-*b*).

Accordingly, the quantity of microbumps dedicated to providing a ground voltage or a positive voltage (e.g., VSS, VDDC, VDDQ, VPP, and VDDQL microbumps) to the memory device 905-*a* and the memory device 905-*b* may be reduced or eliminated. This may decrease the total quantity of microbumps, which may increase the area available for other types of microbumps (e.g., signal microbumps). Additionally, or alternatively, providing voltage via the PMIC 910 through a back interface of the memory device 905-*a* and the memory device 905-*b* may allow for a higher voltage to be provided to the memory device 905-*a* and the memory device 905-*b*, which may increase the power available for the memory device 905-*a* and the memory device 905-*b*.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 1: An apparatus, including: a substrate; a heatsink assembly; and a high bandwidth memory positioned between the substrate and the heatsink assembly, where a voltage is supplied to the high bandwidth memory via the heatsink assembly.

Aspect 2: The apparatus of aspect 1, where the high bandwidth memory includes: a plurality of memory dies; a plurality of microbumps coupled with the plurality of memory dies, the plurality of microbumps configured to provide power to the plurality of memory dies based at least in part on the voltage supplied via the heatsink assembly; and an integrated circuit coupled with the plurality of microbumps, the integrated circuit configured to control a voltage value associated with the power for the plurality of microbumps, where the plurality of memory dies, the plurality of microbumps, or the integrated circuit, or a combination thereof, are arranged in a vertical stack.

Aspect 3: The apparatus of aspect 2, where the high bandwidth memory includes: an interface die coupled with the plurality of memory dies, the plurality of microbumps, or the integrated circuit, or a combination thereof, where the interface die is configured to provide an interface for signaling between the plurality of memory dies, the plurality of microbumps, or the integrated circuit, or a combination thereof.

Aspect 4: The apparatus of aspect 3, where the interface die is positioned below the plurality of memory dies and above the plurality of microbumps.

Aspect 5: The apparatus of any of aspects 3 through 4, where the interface die is configured with the integrated circuit.

Aspect 6: The apparatus of any of aspects 3 through 5, where the integrated circuit is positioned below the interface die and above the plurality of microbumps.

Aspect 7: The apparatus of any of aspects 2 through 6, where the integrated circuit includes a voltage regulator module for controlling the voltage value for the plurality of microbumps.

Aspect 8: The apparatus of any of aspects 2 through 7, where: a front interface of the high bandwidth memory includes the plurality of microbumps, and the integrated circuit is configured to control the voltage value for the plurality of microbumps positioned on the front interface of the high bandwidth memory.

Aspect 9: The apparatus of any of aspects 2 through 8, where the integrated circuit includes a power management integrated circuit (PMIC).

An apparatus is described. The following provides an overview of aspects of the apparatus as described herein:

Aspect 10: An apparatus, including: a plurality of memory dies; a plurality of microbumps coupled with the plurality of memory dies, the plurality of microbumps configured to provide a voltage value to the plurality of memory dies; and a heatsink assembly coupled with the plurality of memory dies, the heatsink assembly positioned above the plurality of memory dies, the plurality of memory dies, the plurality of microbumps, or both, are arranged in a vertical stack, where the apparatus is configured to provide a ground voltage to the plurality of memory dies via the heatsink assembly positioned above the plurality of memory dies.

Aspect 11: The apparatus of aspect 10, further including: an interface die coupled with the plurality of memory dies, the plurality of microbumps, or both, where the interface die is configured to provide an interface for signaling between the plurality of memory dies and the plurality of microbumps, or both.

Aspect 12: The apparatus of any of aspects 10 through 11, where: the plurality of microbumps are configured to provide power to the plurality of memory dies based at least in part on the voltage value for the plurality of memory dies, and the plurality of microbumps are configured for signaling to the plurality of memory dies.

An apparatus is described. The following provides an overview of aspects of the apparatus as described herein:

Aspect 13: An apparatus, including: a plurality of memory dies; a plurality of microbumps coupled with the plurality of memory dies, the plurality of microbumps configured for signaling to the plurality of memory dies; an integrated circuit coupled with the plurality of memory dies, the integrated circuit configured to control a voltage value to provide power to the plurality of memory dies, where the plurality of memory dies, the plurality of microbumps, or the integrated circuit, or a combination thereof, are arranged in a vertical stack; and a heatsink assembly coupled with the integrated circuit, where the apparatus is configured to provide power to the plurality of memory dies via the heatsink assembly, the heatsink assembly positioned above the integrated circuit.

Aspect 14: The apparatus of aspect 13, further including: an interface die coupled with the plurality of memory dies, the plurality of microbumps, or both, where the interface die is configured to provide an interface for signaling between the plurality of memory dies, the plurality of microbumps, or the integrated circuit, or a combination thereof.

Aspect 15: The apparatus of aspect 14, where the interface die is positioned below the plurality of memory dies and above the plurality of microbumps.

Aspect 16: The apparatus of any of aspects 14 through 15, where: the integrated circuit is positioned above the plurality of memory dies, and the integrated circuit is programmable using a fuse associated with a respective memory die of the plurality of memory dies.

Aspect 17: The apparatus of any of aspects 13 through 16, where the integrated circuit includes a voltage regulator module for controlling a voltage value for the plurality of microbumps.

Aspect 18: The apparatus of any of aspects 13 through 17, where: the apparatus includes a high bandwidth memory (HBM), a front interface of the HBM includes the plurality of microbumps, and the integrated circuit is configured to provide power to the plurality of memory dies via a back interface of the HBM.

Aspect 19: The apparatus of any of aspects 13 through 18, where: the heatsink assembly includes a first portion associated with a positive voltage value and a second portion associated with a ground voltage value, and the first portion and the second portion are coupled with the integrated circuit.

Aspect 20: The apparatus of any of aspects 13 through 19, where: the heatsink assembly includes a interleaving pattern including a plurality of first portions associated with a positive voltage value interleaved between a plurality of second portions associated with a ground voltage value, and the plurality of first portions and the plurality of second portions are coupled with the integrated circuit.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "electrode" may refer to an electrical conductor, and in some examples, may be employed as an electrical contact to a memory cell or other component of a memory array. An electrode may include a trace, a wire, a conductive line, a conductive layer, or the like that provides a conductive path between components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a substrate;
a heatsink assembly; and
a high bandwidth memory positioned between the substrate and the heatsink assembly, wherein a voltage is supplied to the high bandwidth memory via the heatsink assembly.

2. The apparatus of claim 1, wherein the high bandwidth memory comprises:
a plurality of memory dies;
a plurality of microbumps coupled with the plurality of memory dies, the plurality of microbumps configured to provide power to the plurality of memory dies based at least in part on the voltage supplied via the heatsink assembly; and an integrated circuit coupled with the plurality of microbumps, the integrated circuit configured to control a voltage value associated with the power for the plurality of microbumps, wherein the plurality of memory dies, the plurality of microbumps, or the integrated circuit, or a combination thereof, are arranged in a vertical stack.

3. The apparatus of claim 2, wherein the high bandwidth memory comprises:

an interface die coupled with the plurality of memory dies, the plurality of microbumps, or the integrated circuit, or a combination thereof, wherein the interface die is configured to provide an interface for signaling between the plurality of memory dies, the plurality of microbumps, or the integrated circuit, or a combination thereof.

4. The apparatus of claim 3, wherein the interface die is positioned below the plurality of memory dies and above the plurality of microbumps.

5. The apparatus of claim 3, wherein the interface die is configured with the integrated circuit.

6. The apparatus of claim 3, wherein the integrated circuit is positioned below the interface die and above the plurality of microbumps.

7. The apparatus of claim 2, wherein the integrated circuit comprises a voltage regulator module for controlling the voltage value for the plurality of microbumps.

8. The apparatus of claim 2, wherein:

a front interface of the high bandwidth memory comprises the plurality of microbumps, and the integrated circuit is configured to control the voltage value for the plurality of microbumps positioned on the front interface of the high bandwidth memory.

9. The apparatus of claim 2, wherein the integrated circuit comprises a power management integrated circuit (PMIC).

10. An apparatus, comprising:

a plurality of memory dies;

a plurality of microbumps coupled with the plurality of memory dies, the plurality of microbumps configured to provide a voltage value to the plurality of memory dies; and a heatsink assembly coupled with the plurality of memory dies, the heatsink assembly positioned above the plurality of memory dies, wherein the plurality of memory dies, the plurality of microbumps, or both, are arranged in a vertical stack, and wherein the apparatus is configured to provide a ground voltage to the plurality of memory dies via the heatsink assembly positioned above the plurality of memory dies.

11. The apparatus of claim 10, further comprising:

an interface die coupled with the plurality of memory dies, the plurality of microbumps, or both, wherein the interface die is configured to provide an interface for signaling between the plurality of memory dies and the plurality of microbumps, or both.

12. The apparatus of claim 10, wherein:

the plurality of microbumps are configured to provide power to the plurality of memory dies based at least in part on the voltage value for the plurality of memory dies, and the plurality of microbumps are configured for signaling to the plurality of memory dies.

13. An apparatus, comprising:

a plurality of memory dies;

a plurality of microbumps coupled with the plurality of memory dies, the plurality of microbumps configured for signaling to the plurality of memory dies;

an integrated circuit coupled with the plurality of memory dies, the integrated circuit configured to control a voltage value to provide power to the plurality of memory dies, wherein the plurality of memory dies, the plurality of microbumps, or the integrated circuit, or a combination thereof, are arranged in a vertical stack; and a heatsink assembly coupled with the integrated circuit, wherein the apparatus is configured to provide power to the plurality of memory dies via the heatsink assembly, the heatsink assembly positioned above the integrated circuit.

14. The apparatus of claim 13, further comprising:

an interface die coupled with the plurality of memory dies, the plurality of microbumps, or both, wherein the interface die is configured to provide an interface for signaling between the plurality of memory dies, the plurality of microbumps, or the integrated circuit, or a combination thereof.

15. The apparatus of claim 14, wherein the interface die is positioned below the plurality of memory dies and above the plurality of microbumps.

16. The apparatus of claim 14, wherein:

the integrated circuit is positioned above the plurality of memory dies, and the integrated circuit is programmable using a fuse associated with a respective memory die of the plurality of memory dies.

17. The apparatus of claim 13, wherein the integrated circuit comprises a voltage regulator module for controlling a voltage value for the plurality of microbumps.

18. The apparatus of claim 13, wherein:

the apparatus comprises a high bandwidth memory (HBM), a front interface of the HBM comprises the plurality of microbumps, and the integrated circuit is configured to provide power to the plurality of memory dies via a back interface of the HBM.

19. The apparatus of claim 13, wherein:

the heatsink assembly comprises a first portion associated with a positive voltage value and a second portion associated with a ground voltage value, and the first portion and the second portion are coupled with the integrated circuit.

20. The apparatus of claim 13, wherein:

the heatsink assembly comprises a interleaving pattern comprising a plurality of first portions associated with a positive voltage value interleaved between a plurality of second portions associated with a ground voltage value, and the plurality of first portions and the plurality of second portions are coupled with the integrated circuit.

* * * * *